Figure 1:
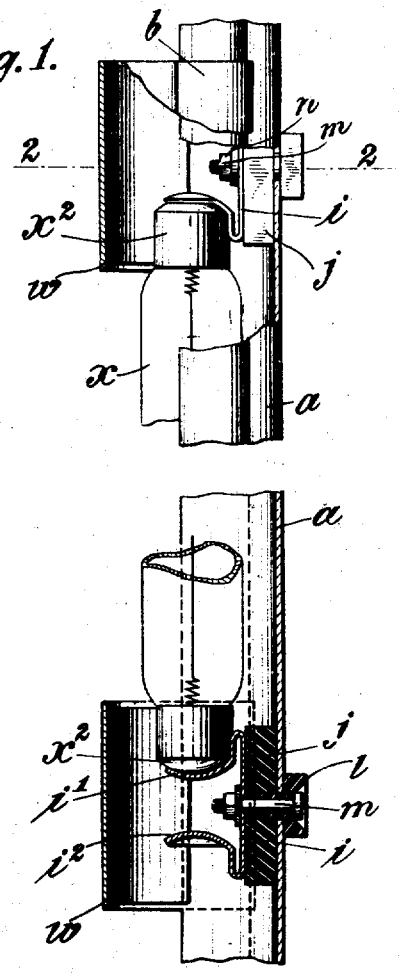

A. W. BEUTTELL.

ILLUMINATING DEVICE.

APPLICATION FILED MAY 13, 1908.

12,907. Reissued Jan. 5, 1909.

Witnesses

Inventor

Alfred William Beuttell

By his Attorneys

Liddell Wendell & Varney

UNITED STATES PATENT OFFICE.

ALFRED WILLIAM BEUTTELL, OF NEW YORK, N. Y.

ILLUMINATING DEVICE.

No. 12,907. Specification of Reissued Letters Patent. Reissued Jan. 5, 1909.

Original No. 831,821, dated September 25, 1906. Application for reissue filed March 25, 1908, Serial No. 423,273. Divided and this application for reissue filed May 13, 1908. Serial No. 432,745.

*To all whom it may concern:*

Be it known that I, ALFRED WILLIAM BEUTTELL, a subject of the King of Great Britain, residing at the present time in the borough of Manhattan of the city of New York, in the county and State of New York, have invented certain new and useful Improvements in Illuminating Devices, of which the following is a specification, reference being had to the accompanying drawings, forming a part hereof.

This invention relates to improvements in mountings and fittings for lamps which are tubular in form and in particular for lamps known as double-ended incandescent lamps; and its object is to provide a novel form of mounting or fitting in which a spring is employed for the purpose of making electrical contact with the electrodes at each end of the lamp and also for the purpose of positioning the lamp definitely between any two such mountings or fittings.

In mounting these lamps it is preferable to employ a tubular member or socket in which the ends of the lamp are received and supported, such ends generally being capped and often alive, as it is through these ends that the electrodes pass. The tubular members cover up and protect the ends and form a very convenient means for shielding the live parts such as the electrodes, contacts etc. It will be obvious, however, that with the tubular members nearer together than a lamp's length (which arrangement is necessary if both ends of the lamp are to be received in the adjacent tubular members), some means must be adopted for inserting and fastening the lamps between said tubular members. If the latter are formed with outside openings, or any other makeshift for permitting the insertion of the lamps, and are rigidly mounted upon their frame, as is preferably the case, then a lamp to be placed in position must have one end inserted far enough into one tubular member until the other end can be brought into the adjacent member.

In accordance with the present invention a relatively stiff spring is provided in each tubular member so that in placing a lamp in position, one end is first inserted into a socket and is pushed into the socket against the spring therein far enough to permit the other end of the lamp to be inserted into the adjacent socket; then the two springs at the respective ends of the lamp adjust the lamp between them in such a position that both of its ends will be duly capped or covered by the tubular members,—a result which would not always happen unless the springs were stiff enough to insure a definite position for the lamps.

Lamps of the character referred to are often arranged in line so as to give a line of light, and the tubular members are accordingly arranged each to receive the opposing caps or ends of adjacent lamps. In further accordance with this invention, the springs in each tubular member are preferably made of a single or integral piece embodying two spring contacts or terminals.

In the drawings, one embodiment of the invention is illustrated and shows a short length of a reflector frame having two of the tubular members secured thereto and one lamp in position between said members.

Figure 2:
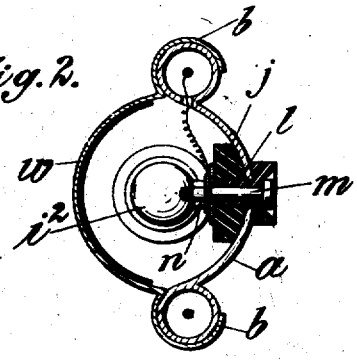

In said drawings:—Figure 1 is a longitudinal section view of the device, and, Fig. 2 is a transverse section thereof on the plane indicated by the line 2—2 in Fig. 1.

The single plate $i$ has integral with it two contact pieces or terminals $i'$ and $i^2$ and is firmly attached to the reflector or other frame and insulated thereon in any suitable manner as, for instance, by means of a block of insulating material $j$, adapted to fit the inside of the frame $a$ and through which passes a bushing $l$ of insulating material to the exterior of the frame $a$. Through the bushing $l$ and the plate $i$ a screw or bolt $m$ may be passed and may be provided with a nut and washer $n$ screwed on the inside thereof in order to hold this plate and its spring contact pieces firmly in position.

Electrical connection is made between the lamps and conducting wires, (which are preferably located respectively in beads $b$ formed on each side of the frame and running along longitudinally therewith), by connecting the alternate plates $i$ with the same wire, so that when a lamp is in position between the spring clip $i'$ at one end and the spring clip $i^2$ at the other end a current will be passed through its filament, the electrodes of the lamp being in electrical contact with the clips $i'$ and $i^2$ respectively. Each lamp support is therefore a double support and will connect the opposing ends of the two adjacent lamps to one pole of the electric circuit.

Over the supporting plates and their terminals $i'$ and $i^2$ a shield $w$ may be placed which shield can be made removable if desired. This shield forms with the frame $a$ what may be referred to as a tubular member into which the opposing ends of adjacent lamps are received. From the drawing, it will be seen that in order to cover up the caps and other live parts of the lamps and supports, it is necessary that each of the lamps shall be definitely positioned so that the cap shall at all times remain covered by the tubular members or shield $w$ and hence the spring pieces $i'$ and $i^2$ must be relatively stiff so as to maintain the lamps always in a predetermined position.

The manner of inserting and withdrawing the lamp will be understood from the foregoing and the drawings, as will also its manner of support within the tubular members at each end thereof.

Many departures may be made from the aonstruction shown and described without cvoiding the spirit of the invention. For instance, in the drawings, the caps $x^2$ upon the ends of the lamp are made to do service as electrodes, but, as will be obvious, the latter may be otherwise embodied in the improved structure. Moreover, the form of the tubular members at the ends of the lamp may be changed in many ways as also may the lamp supports and the relation of the latter to the tubular members. Of course, too, it is not necessary that the frame $a$ be a reflector so far as the present invention is concerned.

I claim as my invention:

1. In an illuminating device, the combination with a double-ended incandescent lamp having at each end a cap embodying an electrode, of a frame, a tubular member at each end of the lamp in which members the respective caps on the lamps are received, and a spring terminal within each tubular member adapted to make electrical contact with the corresponding electrode of the lamp, the spring terminals being relatively stiff to position the lamp definitely and thus maintain its ends at all times within the tubular members.

2. In an illuminating device, the combination with a plurality of double-ended incandescent lamps arranged end to end, each such lamp having at each of its ends a cap embodying an electrode, of a frame, tubular members on the frame and in each of which the opposing caps of the two adjacent lamps are received, and spring contact members within each tubular member adapted to make electrical contact with the corresponding electrodes of the two adjacent lamps, the said spring contact members being relatively stiff so as to position the lamps definitely between the tubular members and maintain each lamp with its ends at all times within the adjacent tubular members.

3. In an illuminating device, the combination with a plurality of double-ended incandescent lamps arranged end to end, each such lamp having at each end a cap embodying an electrode, of a frame, tubular members on the frame, and a single spring within each tubular member embodying two contact members one for each of the two lamps entering said tubular member, each of said springs embodying electrically one electrode and being adapted to make electrical contact with the corresponding electrodes in said lamps.

This specification signed and witnessed this 6th day of May, A. D., 1908.

ALFRED WILLIAM BEUTTELL.

Signed in the presence of—

LUCIUS E. VARNEY,

HOMER H. SNOW.